Dec. 15, 1959 G. WHITE 2,917,588

APPARATUS FOR RECORDING AND PLAYBACK

Filed Aug. 31, 1953 2 Sheets-Sheet 1

INVENTOR

Gale White

BY Stevens, Davis, Miller & Mosher

ATTORNEYS

Dec. 15, 1959 G. WHITE 2,917,588

APPARATUS FOR RECORDING AND PLAYBACK

Filed Aug. 31, 1953 2 Sheets-Sheet 2

INVENTOR
Gabe White

BY Stevens, Davis, Miller & Mosher
ATTORNEYS 2,917,588

APPARATUS FOR RECORDING AND PLAYBACK

Gale White, Dallas, Tex., assignor to Texas Instruments Incorporated, Dallas, Tex., a corporation of Delaware Application August 31, 1953, Serial No. 377,414

9 Claims. (Cl. 179—100.2)

This invention relates to a method and apparatus for recording, and more particularly to a novel method and apparatus for magnetic recording.

In the past, the art of magnetic recording has been restricted to two distinct types. In the first of these types, known as intensity recording, the intensity of remanent magnetism increases or decreases along the length of the recording medium as the applied signal rises and falls in amplitude. The recording medium, as a result, becomes magnetized according to its hysteresis characteristic and remains magnetized to a certain extent when the signal is removed. The distance the recording medium has been carried toward saturation on its hysteresis curve determines the amount of remanent magnetism. According to this type of recording, a remanent or residual magnetization is produced in the recording medium proportional in value to the instantaneous value of the signal strength. A characteristic of recording media is that a plot of the remanent magnetization values produced by corresponding signal values, gives a wave form which is distorted from the original wave form of the signal. If it were not for the fact that D.C. and A.C. biasing is available for straightening the non-linear distortion of the remanent magnetization curve, the intensity type of magnetic recording would have only a limited use.

The second type of magnetic recording is the boundary-displacement type. In this type, a static bias field is applied across a recording head gap which extends across the recording medium. The intensity of this static bias field is a function of its position along the gap and it is characterized by varying linearly from an arbitrarily selected positive value at one edge of the recording medium (tape) to an equal negative value at the other edge. The field is at zero value at the mid point between the two edges. As a result of this arrangement, a static bias field causes the magnetic tape to be positively saturated on one-half, negatively saturated on the other half, and a boundary or transition area in an unsaturated magnetic state to be defined between the two halves. As the saturation field intensity of the recording medium is very small compared to the bias field applied, this region of transition is quite narrow. Signals, to be recorded, are superimposed upon the bias field to produce a vertical displacement of the resultant field intensity curve and thus shifting of the zero point toward either side of the tape. In this form of recording, the wave form of the signal is traced on the recording medium to affect changes in the areas of positive and negative saturation. A conventional magnetic tape pick-up head is used for play-back. The pick-up head receives the net flux from the two areas of saturation. Thus, no signal is received by the pick-up head unless one of the saturated areas is larger than the other.

In both types of magnetic recording, tapes are employed upon which a magnetic material has been predeposited. In both types, the recording of a signal depends upon magnetization of the recording medium.

It is the prime objective of the present invention to provide a novel method and apparatus for magnetic recording wherein the deposition of a magnetic material on a non-magnetic medium is retarded in proportion to the strength of applied signals. According to the method of the present invention, the material is deposited in a non-magnetized state as contrasted with the two presently known types of magnetic recording.

It is a further object of the present invention to provide a method of recording and play-back in which paper or any other suitable material, whether in the form of a sheet, disc, strip or a cylinder can act as the medium to receive the magnetic material deposited in response to applied signals.

It is a still further object of the present invention to provide a method wherein the recording head can be moved relative to the record receiving medium or vice versa. By means of the present invention, it is possible to use a portable hand-operated recorder as well as a conventional type of recorder structure in which the medium is moved past the recording head by a motor-driven mechanical arrangement to practice the method taught by this invention.

It is also an object of the present invention to provide a novel recording apparatus which will be characterized by a simple structure and which will operate more efficiently and economically than recorders previously available.

Other objects and advantages of the present invention will become readily apparent upon a detailed consideration of the following description when taken in conjunction with the drawings in which.

Figure 1:
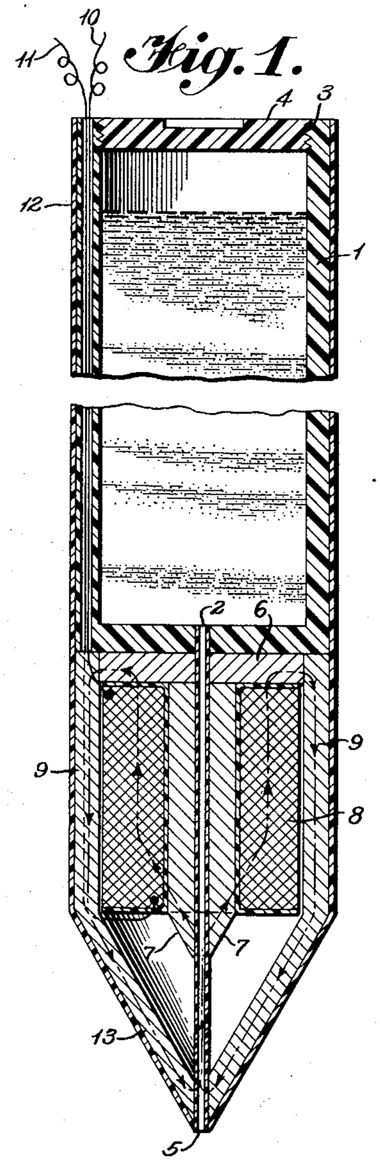
Figure 1 is a view in section through a vertical axis of the recording unit of the present invention.

Referring now to the drawings, Figure 1 shows a cross-sectional view of a recording unit made according to the teachings of the present invention. The recording unit, as shown, is similar in appearance to a fountain pen though slightly longer and slightly larger in diameter. A reservoir 1, forming the upper portion of the recording unit, is of cylindrical shape and is closed at its lower end by a bottom plate. A small hole 2 is provided in the center of the bottom plate. The top end of the reservoir 1 is threaded as indicated at 3 so that the reservoir 1 may be closed by means of a cap 4 provided with threads to mate with threads 3. The cap 4 serves to permit the reservoir 1 to be filled as required. A tube 5 is inserted into the hole 2 and extends downwardly to the tip of the recording unit. Directly below the reservoir 1 and surrounding the tube 5 are the parts that provide the electro-magnetic circuit. They include a circular disc 6, having a hole only slightly larger in diameter than the outside diameter of the tube 5, placed immediately below the reservoir 1. A circular tube 7, having quite thick walls, fits around the tube 5 and bears against the undersurface of circular disc 6. A signal coil 8 fits around the thick walled circular tube 7 also beneath the circular disc 6. The lower portion of the recording unit and the remainder of the magnetic path is formed by a cylindrical-conical shaped outer section 9 which is of a cylindrical shape for a length sufficient to enclose the signal coil 8 and thereafter tapers to a point at the discharge end of the tube 5. The circular disc 6, the thick walled top 7, and the cylindrical-conical shaped section 9 are composed of soft iron or any other suitable material that will provide a low reluctance magnetic flux path. Signals are applied to the coil 8 through lead wires 10 and 11 which can be led through any convenient passageway formed in the recorder, as for example, through the wall of the reservoir 1. The recording unit is completely enclosed by a protective sheath 12 with the exception of the cap 4 and the discharge end of the tube 5.

The recording unit, as shown in Figure 1, operates as follows. The reservoir 1 is filled through cap 4 with a finely divided iron powder suspended in a fluid having the characteristics of being quick drying and a good adhesive to bond the iron particles together and to the medium upon which the iron particles are to be deposited. For the purpose of illustration, this medium will be spoken of as being paper. During filling of the reservoir 1, the iron-fluid mixture will, in the process, fill the tube 5. Since, however, the inside diameter of this tube is selected to produce a capillary action on the iron-fluid mixture, the mixture will not flow from the tube 5 until the end of the tube is drawn across the recording medium. In this instance, the device operates in a manner very similar to the operation of a fountain pen. When thus prepared, the recording unit is ready for recording. Signals are applied to the coil 8 of the unit through the leads 10 and 11 from an amplifier (not shown). As the signals are applied to the coil 8, a flux will be generated which will flow upwardly into the circular disc 6, downwardly through the cylindrical-conical shaped section 9, into the tube 5 and iron-fluid mixture, and then back through the thick walled circular tube 7 to the signal coil 8. This flux path is indicated in the drawing by the dash line identified by the numeral 13.

The amount of flux generated by the coil 8 will depend on the amplitude of the signal applied through the leads 10 and 11. When a flux is passing through the recording unit, as indicated, the flow of iron-fluid mixture from tube 5 will be retarded due to the force between the iron particles caused by the flux. As the flux, generated by the coil 8, depends on the amplitude of the signal applied, the flow of the iron-fluid mixture in and from the tube 5 will be influenced directly by the signal applied to the coil 8. Hence, the concentration of iron powder deposited on the receiving medium (paper) will be in proportion to the applied signals. Thus, for example, if the signals are caused by sounds spoken into a microphone, then the iron concentration deposited is a measure of the sounds. It is apparent at this time, that a record can be made by creating relative movement between the recording unit and the medium upon which the iron-fluid mixture is to be deposited. By reason of the mode of operation of the apparatus as above described, maximum deposition occurs when no signal is being applied to the recording unit as it moves relative to the record receiving medium. As signals are applied to the recording unit, the amount of iron deposited is retarded in accordance with the strength of applied signals; or in other words, the iron is deposited in an amount inversely proportional to the strength of applied signals.

Figure 2:
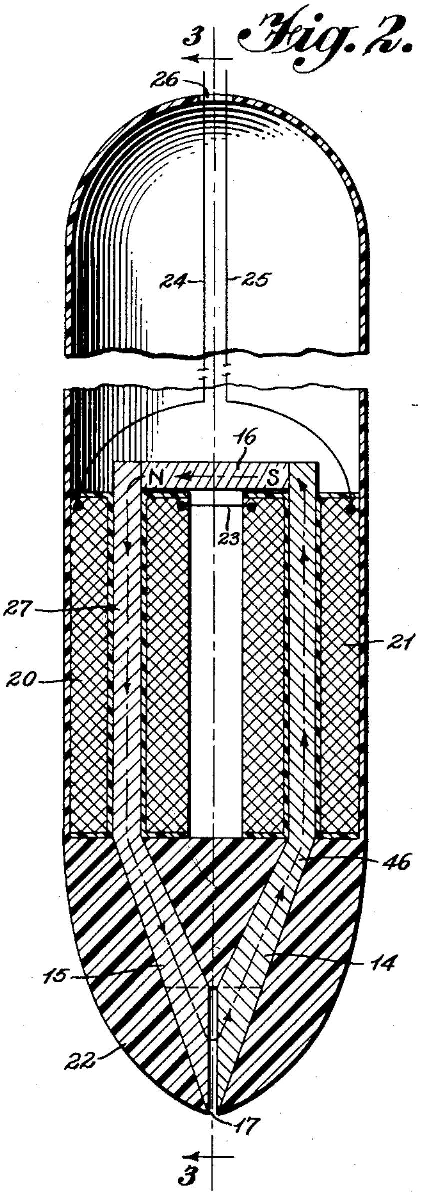
Figure 2 is a view in vertical section through the axis of a play-back unit according to the present invention.
Figure 3:
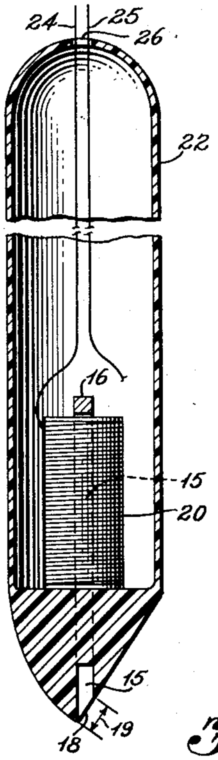
Figure 3 is a view in section of the play-back unit shown in Figure 2 taken along line 3—3.

The pick-up or play-back portion of the recording apparatus is shown in Figures 2 and 3. It will be noted that the play-back unit corresponds generally in appearance to the recording unit. The detection of the iron concentration deposited on the receiving medium (paper) is accomplished by two magnetic path sections 14 and 15 arranged in conjunction with a permanent magnet 16 and an air gap 17. The upper ends of the two sections

14 and 15 are spaced apart by means of the permanent magnet 16. The lower ends of the sections 14 and 15 angle inwardly to form a triangular shape. The lower ends of the sections 14 and 15 are also triangular from a side view, as indicated by the numeral 18 in Figure 3. The numeral 19 in Figure 3 represents the portion of the magnetic circuit which is separated by the gap 17. This portion 19 of the magnetic circuit is exposed to the iron deposited on the paper and functions as the detecting area. With the arrangement thus described, it is apparent that any position along the detecting area 19 when in contact with the deposited iron will provide a variable reluctance path across the gap 17. A pair of induction coils 20 and 21 are arranged within housing sheath 22 of the play-back unit so that each of the coils surrounds one of the magnetic sections 14 and 15. The coils are located vertically between the permanent magnet 16 and the lower triangular sections of the sections 14 and 15. The two coils 20 and 21 are connected together by means of a wire 23. A lead wire 24 connected to the coil 20 and a lead wire 25 connected to the coil 21 are brought through an opening 26 in the top of the sheath 22. This sheath 22 completely encloses the play-back unit, with exception of gap 17 along the detecting area 19. Although the triangular shaped detecting area 19, described previously, is suitable when the play-back unit is held at an angle, it is not suitable when the unit is to be mounted vertically. It is contemplated that the shape of the detecting area 19 be selected to provide the optimum area for detection in each particular application of the invention.

The operation of the play-back unit is as follows. The permanent magnet 16 generates a flux which follows a path 27 from the north pole N of the magnet through section 15, across gap 17 and back to the south pole S of the magnet through section 14. When the magnetic sections 14 and 15, along the gap 17, are in contact with the deposited iron and there is a relative movement between the play-back unit and the deposited iron, the flux will take the path of less resistance which, in the arrangement above described, is the path afforded by the deposited iron. The reluctance of the path through the deposited iron decreases as the concentration of the deposited iron increases. More flux, therefore, flows through the greater concentrations of iron deposits. The varying flux, across the gap 17, changes the flux in the sections surrounded by the coils 20 and 21, which in turn will induce varying voltages in the coils. The voltages, induced in the coils, are then carried by lead wires 24 and 25 to the input of an amplifier (not shown). To complete the recording and play-back signal, it is only necessary to thereafter connect the amplifier output to a speaker.

To demonstrate the practicality of the present invention, reference will now be made to Figure 4. There is shown in this figure, a schematic diagram of a portable recording and play-back apparatus. The amplifier circuit and battery power source for the portable recording and play-back apparatus are contained within case 30. A switch 31 is provided to control the recording and play-back functions of the apparatus. With the switch 31 in the neutral position between positions 32 and 33, neither recording nor play-back is possible. When the switch 31 is moved to position 32, a microphone 34 is connected to the input of the amplifier circuit through leads 35 and 36 and the recording unit A is connected to the output of the amplifier circuit by means of leads 37 and 38. With the apparatus in this condition, speaking into the microphone 34 will result in the speech being recorded by the unit A when it is moved by hand relative to a receiving medium at the required recording speed. As described above, with reference to the operation of the recording unit, iron will be deposited on the receiving medium in a concentration proportional to the varying voltages produced by the microphone 34. When the switch 31 is turned to the play-back position 33, the play-back unit B will be connected to the input of the amplifier circuit through leads 39 and 40 and a speaker 41 will be connected to the amplifier output through leads 42 and 43. By moving the play-back unit B over the deposited iron at the required speed, the reluctance across the gap 17 of the play-back unit B will vary in accordance with the concentration of the deposited iron, thus producing a voltage in the coils of the play-back unit B, which will be fed to the input of the amplifier circuit through the leads 39 and 40. The output from the amplifier circuit will pass to the speaker 41 through the leads 42 and 43 which in turn will reproduce the pre-recorded sounds that were originally spoken into the microphone 34.

Figure 4:
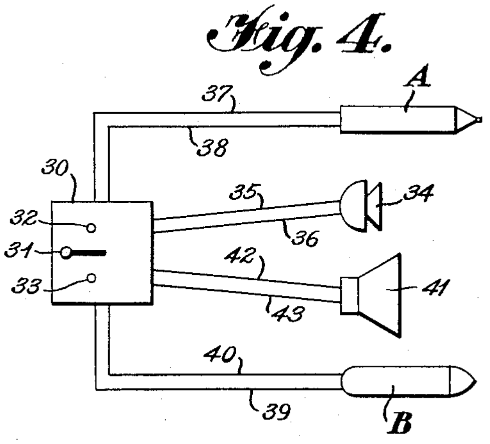
Figure 4 is a schematic diagram illustrating the manner in which the recording apparatus of the present invention can be made into a portable hand unit.

The portable arrangement shown in Figure 4 can be fashioned into a compact efficient unit capable of operating under extreme conditions. Also, it can be varied in a number of ways. For example, the microphone 34 and the speaker 41 can be combined into a single reversible element with its leads connected to the input and output of the amplifier circuit under the control of the switch 31. Another possible arrangement would be for the recording unit A and the play-back unit B to be formed into a single unit by the use of an appropriate magnetic circuit and coil arrangement.

Figure 5:
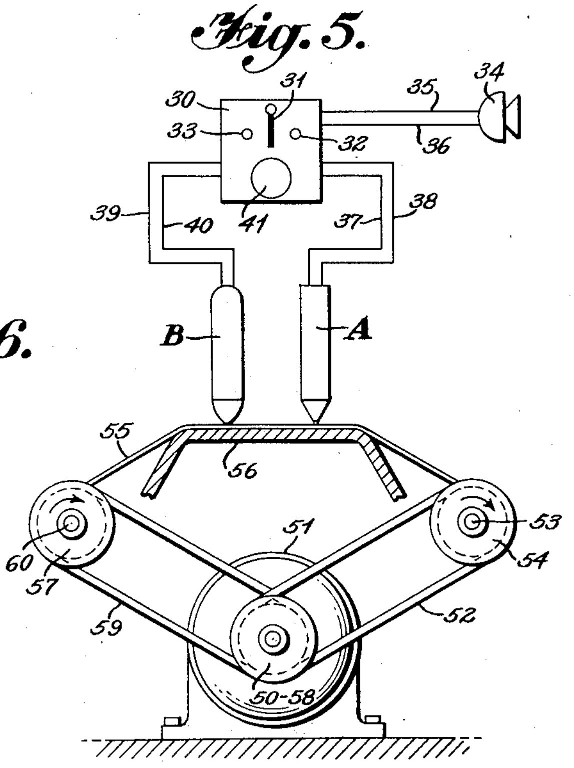
Figure 5 is a schematic view showing how the recording apparatus of the present invention can be incorporated into a conventional type of tape recording unit.

The use of the present invention in a conventional recording arrangement is shown schematically in Figure 5. The recording unit A and the play-back unit B are arranged to perform their functions in the same manner as is shown in Figure 4 with the exception of the speaker 41 being built into the case 30. As shown in this figure, the paper to receive the iron deposited from the recording unit A is moved with respect to both the recording unit A and the play-back unit B which are held stationary. A pulley 50 is mounted on the output shaft of a motor 51 and connected through a belt 52 to a pulley 53. The pulley 53 is mechanically connected to a roll 54 which pulls a paper strip 55 across a platen 56 from a roll 57. When the recording unit A is depositing iron on the strip of moving paper 55, the roll 54 is rotating clockwise and the play-back unit B is maintained out of contact with the strip of paper 55. Any suitable mechanical arrangement can be provided to perform this function. A pulley 58 is coaxially mounted on the output shaft of the motor 51 with pulley 50. This pulley 58 is connected by a belt 59 with a pulley 60 mechanically connected to the roll 57. When the pulley 50 is being driven by the motor 51, the pulley 58 is disengaged from the output shaft of the motor. This disengagement can be by any conventional means, as for example, by a clutch. When it is desired to rewind the paper strip 55 onto the spool 57, the motor 51 is reversed, the pulley 58 is engaged with the output shaft of the motor 51 and the pulley 50 is disengaged. The motor 51, acting through the pulley 58 and belt 59, will drive the pulley 60 and turn the roll 57 in a counter clockwise direction. When the record on the strip 55 is to be played back, the play-back unit B is brought into contact with the strip 55, the recording unit A is maintained out of contact with the strip 55, and the motor 51, acting through the pulley 50 and belt 52, drives the pulley 53 and spool 54 clockwise. The detecting area of the play-back unit B, as previously indicated, will not be triangular in shape in this instance, but rather will be rectangular along the length of the gap 17. Any conventional or known means can be employed in this type of arrangement for moving the paper strip 55 past the play-back unit B and recording unit A at a pre-determined speed. The present invention is not limited to the use of any one arrangement for this purpose, as all arrangements that function to accomplish the desired end are equally applicable.

Figure 6:
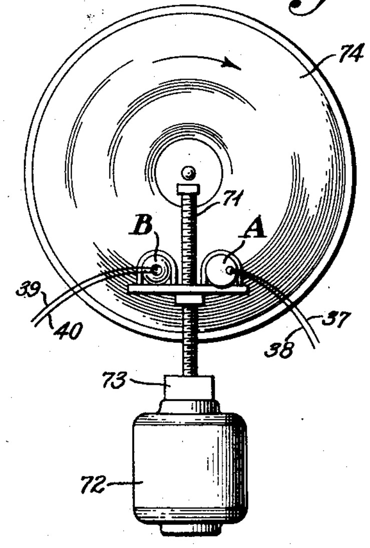
Figure 6 is a schematic view showing how the apparatus for recording of the present invention can be conventionally arranged to record on a disc.

The schematic representation shown in Figure 6 illustrates the utility of the recording and play-back apparatus of the present invention with a disc-type conventional recording arrangement. As shown, the recording unit A and play-back unit B are attached to a bracket 70 which is threaded and mounted on a lead screw 71. The lead screw 71 is rotated by means of a reversible motor 72 through reduction gearing 73. A turntable 74 is arranged to rotate beneath the recording unit A and play-back unit B as these units are advanced by the lead screw 71. The arrangement shown in Figure 6 could be further modified by arranging the apparatus so that the rotating turntable 74 could advance past the recording and play-back units which would, under this condition of operation, be maintained stationary.

This invention presents, for the first time, a method of recording and play-back wherein iron is deposited in a concentration determined by the signal to be recorded, which signal can be reproduced by detecting the so deposited iron. It is immaterial to the present invention whether the apparatus and method is related to a portable unit in which the recording unit is moved relative to a medium to receive the deposited iron or is related to a recording unit wherein the medium to receive the deposited iron is moved past the recording and play-back units by mechanical means. Further, it is within the purview of this invention to cover methods of recording and play-back involving the disposition of iron on any type of medium regardless of whether it is in the form of a sheet, strip, disc or cylinder.

It is sometimes desirable to provide a means to keep the iron-fluid mixture from flowing out of tube 5 instead of relying solely on the capillary action of tube 5. For example, a small permanent magnet positioned beside tube 5 at a suitable point can serve to accomplish this function. Also, since remanent magnetism in the deposited iron would impair the play-back feature of the invention, a demagnetizing means may be required to demagnetize the iron powder after it has passed through the flux field caused by the signals to be recorded. For example, a small A.C. coil can be located at the outlet of tube 5 to perform this function.

Though the present invention has been shown and described in specific embodiments, nevertheless various changes and modifications obvious to one skilled in the art are within the scope, purpose and intent of this invention.

What is claimed is:

1. Apparatus for recording comprising means defining an aperture, means to receive magnetic material, means for depositing magnetic material through said aperture on said means to receive magnetic material, and means for varying the flow velocity through said aperture.

2. An apparatus for recording comprising, means defining an aperture, means to receive magnetic material, means to deposit magnetic material through said aperture on said means to receive magnetic material, and means for varying the flow velocity through said aperture substantially in phase with the variations of the signal to be recorded.

3. An apparatus for recording comprising a tube, means for receiving magnetic material, means for depositing magnetic material through said tube onto said means for receiving magnetic material, and means to apply a variable magnetic field to said tube.

4. An apparatus for recording comprising, a record medium, a recording unit, means to produce relative motion between said recording unit and said record medium, said recording unit comprising an aperture, means to deposit magnetic material through said aperture on said record medium, and means to vary the flow velocity through said aperture.

5. Apparatus for recording and playing back comprising means defining an aperture, means to deposit magnetic material through said aperture, means to vary the flow velocity through said aperture, and means establishing a variable reluctance path as a pick up in which said deposited magnetic material comprises the variable part of said path.

6. Apparatus for recording and play back comprising means defining an aperture, means to deposit magnetic material through said aperture, means to vary the flow velocity through said aperture, and means to detect the concentration of the deposited material, said means to detect including a variable reluctance path in which said magnetic material comprises the variable part of said path.

7. An apparatus for recording comprising a tube, means for receiving magnetic material, means for depositing magnetic material through said tube onto said means for receiving magnetic material, and means to vary the flow velocity through said tube.

8. An apparatus for recording comprising a tube, means for receiving magnetic material, means for depositing a magnetic material and fluid mixture through said tube on said means for receiving magnetic material, said tube having such a diameter to cause capillary action on said mixture, and means to vary the flow velocity through said tube.

9. An apparatus for recording comprising a tube, means for receiving magnetic material, means for depositing through said tube a magnetic material and fluid mixture on said means for receiving magnetic material, said tube having such a diameter to cause capillary action on said mixture, and means to apply a variable strength magnetic field to said tube.

References Cited in the file of this patent

UNITED STATES PATENTS

| | | |
|---|---|---|
| 831,779 | Emerson | Sept. 25, 1906 |
| 934,600 | Fuller | Sept. 21, 1909 |
| 1,152,562 | Sherman | Sept. 7, 1915 |
| 1,218,324 | Severy | Mar. 6, 1917 |
| 1,580,112 | Bone | Apr. 13, 1926 |
| 1,940,274 | Severy | Dec. 19, 1933 |
| 2,614,901 | Jacob | Oct. 21, 1952 |
| 2,616,984 | Pare | Nov. 4, 1952 |
| 2,670,749 | Germer | Mar. 2, 1954 |
| 2,676,868 | Jacob | Apr. 27, 1954 |

FOREIGN PATENTS

| | | |
|---|---|---|
| 703,916 | France | Feb. 16, 1931 |
| 371,329 | Great Britain | 1932 |